May 3, 1938.　　　M. B. JACKSON　　　2,115,776
MOTOR VEHICLE CONTROL
Filed July 27, 1936　　　2 Sheets-Sheet 1
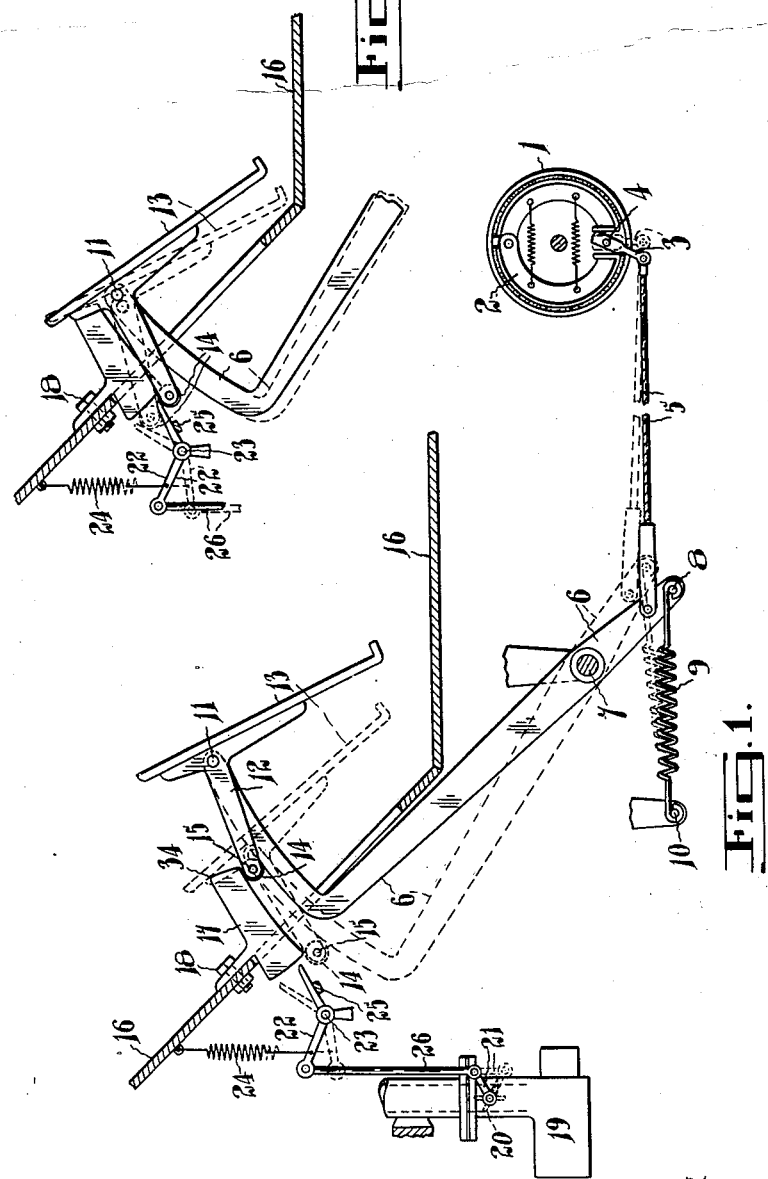
Inventor
M. B. Jackson
By J. Edw. Maybee
ATTY.

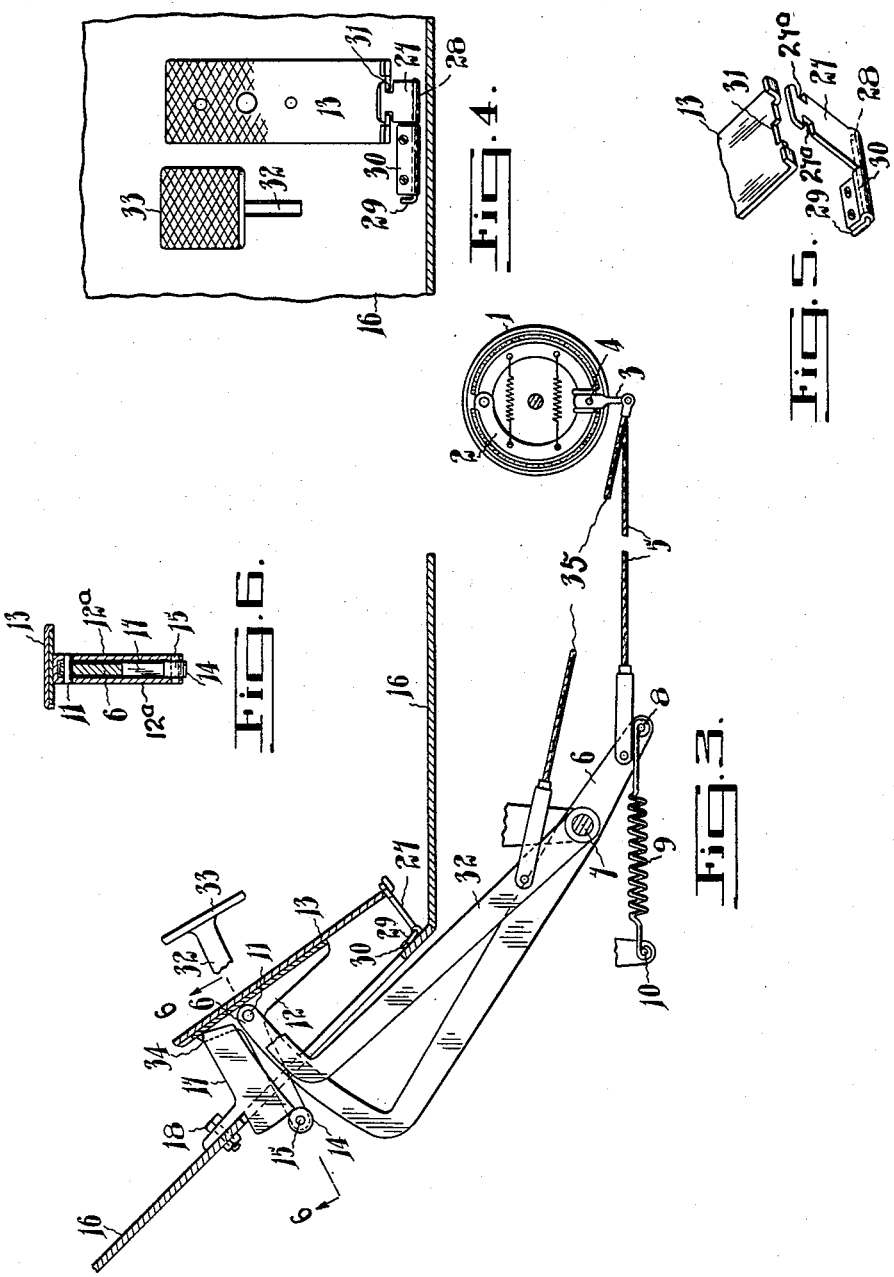

Patented May 3, 1938

2,115,776

UNITED STATES PATENT OFFICE 2,115,776

MOTOR VEHICLE CONTROL

Maunsell B. Jackson, Toronto, Ontario, Canada

Application July 27, 1936, Serial No. 92,720

10 Claims. (Cl. 188—167)

My invention relates to control mechanism for motor vehicles, and the objects of my invention are to provide means for motor vehicle control that 1. Brings the vehicle to a stop should any circumstance cause the driver to relinquish control.
2. Materially lessens the interval between the instant when the driver decides to apply the brakes and the instant of the ensuing application.
3. Compels the driver to do the work necessary for applying the brakes at a time when there is no emergency, necessity for hurry, nor other distracting circumstance.

Other objects I have in mind will appear hereinafter.

I attain these objects by mechanism illustrated in the accompanying drawings in which Fig. 1 is a view of my mechanism, in elevation, with my emergency brake mechanism and release lock omitted, Fig. 2 a similar view of a portion of my mechanism in another position, Fig. 3 a view similar to Fig. 2, showing my emergency brake mechanism and my release lock, Fig. 4 a plan view of my service brake lever foot plate, emergency brake pedal, and my release lock, Fig. 5 a perspective view of my release lock, and, Fig. 6 a section on the line 6—6 in Fig. 3.

Similar numerals refer to similar parts throughout the several views.

1 is a revolving part such as a brake drum. Generally, a plurality of such drums are employed, each being secured to a wheel of the vehicle. 2 is the brake shoe. 3 is the brake arm, free to rock about the pin 4. The free end of the brake arm 3 is attached to a cable 5, the other end of the cable being attached to the lower end of the service brake lever 6. The service brake lever 6 is carried by and free to rock on the shaft 7.

Over a pin 8 which is fastened in the lower end of the service brake lever 6 is hooked a spring 9, the other end of the spring 9 being hooked over the fixed pin 10.

On the upper end of the service brake lever 6 is journaled—on a pin 11—a member 12 carrying a foot plate 13. A roller 14 is rotatably attached to the member 12 by the pin 15 which is fastened between the arms 12a, 12a, of the member. The construction of the member 12, foot plate 13 and roller 14 is shown more in detail in Fig. 6.

16 is the floor of the vehicle.

The retention member 17 is fastened to the floor 16 by the bolt 18.

19 is a carburettor having a throttle 20 attached to and controlled by the lever 21. A bell crank 22 is pivoted about a pin 23 and is free to rock on this pin except as controlled by the spring 24 and the stop 25. A tie rod 26 connects the ends of the throttle lever 21 and the bell crank 22.

27 is the release locking member one end of which has formed therein slots 27a, 27a, adapted to engage a slot 31 in the foot plate 13 (Fig. 5) and the other end of which is rigidly fastened to a shaft 28 having an upturned end 29. The shaft 28 is pivotally carried in the bearing 30 which is fastened to the floor 16.

32 is the emergency brake lever pivotally carried on the shaft 7 and having a foot pedal 33 rigidly attached at the upper end. To the emergency brake lever 32 is attached one end of a cable 35, the other end of the cable being attached to the free end of the brake arm 3.

The operation is as follows:

Assuming the parts to be in the relative positions as shown by the full lines in Fig. 1, in which the service brake lever 6 is rocked clockwise on the shaft 7 as far as the cable 5 and the brake arm 3 will permit, the spring 9 is applying the brake shoe 2 and the car is at rest, the bell crank 22 is also rocked clockwise and rests against the stop 25, the throttle 20 is nearly closed, and the engine (not shown) is idling, the driver places his foot on the foot plate 13 and presses it down until the parts assume the relative positions as shown by the dotted lines in Fig. 1. The foot plate 13 is now contacting the retention member 17 at the point 34 and thus cannot be pressed down further as a whole, the spring 9 is extended, the cable 5 slacked, and the brake arm 3 no longer applying the brake shoe 2, the part 1 is thus free to rotate and the car to start.

The bell crank 22 still rests against the stop 25 and the engine is still idling.

The driver now lowers his heel and rocks the foot plate 13 about the point 34 until the parts assume the relative positions as shown by the full lines in Fig. 2 that is until the centre line of the roller 14 is past the line of the edge of the retention member 17 and thus more than half the roller is under the retention member.

When this position is reached the driver can relieve the foot pressure necessary to extend the spring 9 as the roller 14 under the bottom edge of the retention member 17 will hold the service brake lever 6 down as long as the driver's heel is depressed.

The roller 14 is either in contact with the bell crank 22 or very nearly so but the bell crank has not been rocked and the engine is still idling.

Speeding up the engine from this position consists in lowering the driver's heel, this operation rocks the foot plate 13 clockwise making the roller 14 rock the bell crank 22 counterclockwise, forcing the rod 26 down and thus opening the throttle 20. For example full open throttle position is shown by the dotted lines in Fig. 2.

The slope of the bottom edge of the retention member 17 is made such that there is a constant tendency for the roller 14 to come back to the position shown by the dotted lines in Fig. 1, this may be done for example by making the outline of this edge the circumference of a circle having its centre at the point 34. Thus when the driver desires to apply the brakes he raises his heel and the roller will roll out from under the retention member 17, further raising of the whole foot will apply the brake by bringing the parts back into the position as shown in Fig. 1 by the full lines.

It is often desirable for the driver to be able to lock his brake in the released position as for example should he want to push his car about the garage floor. To enable him to do this I provide the release locking member 27 which is operable as follows.

The driver with his right foot depresses the foot plate 13 until it is in the position as shown by the full lines in Fig. 2 or Fig. 3. With his left foot he then depresses the upturned end 29 of the shaft 28 which brings the release locking member 27 up as shown in Fig. 5 and meshes the slots 27a, 27a, in the member 27 with the slot 31 in the foot plate 13 as shown in Figs. 3 and 4.

The foot plate 13 is now held down by the roller 14 which is held under the bottom of the retention member 17 and thus the service brake is maintained in its off position.

This might seem to be a dangerous position in which to leave the parts as it might be thought that the driver could drive away without noticing that the brake was locked off. This is very unlikely however as until the release locking member 27 is disengaged from the slot 31 it is evident that the driver cannot depress the foot plate 13 and therefore cannot accelerate the engine so any driving done would of necessity be very slow.

I provide also auxiliary mechanism operable by foot to apply the brake consisting of parts 32, 33, and 35. This is my emergency brake and is essentially the same as the service brake now in use, the result being that should anything put my service brake out of commission the emergency action required to stop the car would only be that required for every stop with the system now in use.

From the foregoing it will be seen that I have attained the objects hereinbefore mentioned as should the driver faint or drop dead, a not unfrequent happening, and therefore relinquish control the car would be brought to a stop by the action of my control mechanism actuated by the spring 9.

Again with the system now in use the driver to stop the car must first lift his foot from the accelerator pedal and then force his foot brake down while with my system he need only lift his foot, a manifestly quicker operation.

And further the driver must do the work necessary for applying the brake before commencing to drive since without extending the brake applying spring 9 he cannot operate the accelerator.

What I claim is:

1. A brake mechanism including a control lever; means tending to apply the brake; a foot plate for moving the lever to release the brake, the foot plate being pivoted on the lever; and means operable by rocking the plate relative to the lever for holding the latter in its brake releasing position, the second mentioned means being releasable automatically upon the removal of pressure from the plate to permit the first mentioned means to apply the brake.

2. A brake mechanism including a control lever; means tending to apply the brake; a foot plate for moving the lever to release the brake, the foot plate being pivoted on the lever; and means operable by rocking the plate relative to the lever for releasably holding the latter in its brake releasing position, the said holding means including stationary provisions and provisions carried by the plate adapted to engage the said stationary provisions when force is applied to the foot plate to rock it in one direction and adapted to disengage the said stationary provisions when the said force is removed from the foot plate.

3. A brake mechanism including a control lever; means tending to apply the brake, the lever being adapted to be depressed to release the brake; a foot plate for depressing the lever, the plate being pivoted on the lever; and means operable by rocking the plate for holding the lever in its brake releasing position against the pressure of the first mentioned means, the last mentioned means being releasable automatically upon the removal of pressure from the foot plate.

4. A brake mechanism including a control lever; means tending to apply the brake, the lever being adapted to be depressed to release the brake; a foot plate for depressing the lever, the plate being pivoted on the lever; and means operable by rocking the plate for holding the lever in its brake releasing position against the pressure of the first mentioned means, the lever holding means being adapted to be automatically released upon removal of foot pressure from the foot pedal, whereupon the first mentioned means will apply the brake.

5. A brake mechanism including means tending to apply the brake, a control lever adapted to be moved to overcome the brake applying means, escapement mechanism including stationary provisions and provisions carried by the control lever for holding the control lever in its brake releasing position, the said escapement being adapted to be automatically released upon the removal of the force required to move the control lever whereupon the first mentioned means will apply the brake.

6. A brake mechanism including a control lever; means tending to apply the brake, the lever being adapted to be depressed to release the brake; a foot plate pivoted on the lever, and means operable by rocking the plate for holding the lever in its brake releasing position against the pressure of the first mentioned means, the holding means including a device carried by the foot plate, and a member having an inclined surface adapted to be engaged by the device, the inclination of the surface being such that the device will automatically move out of engagement therewith when the foot pressure is removed from the plate.

7. A brake mechanism including a control lever; means tending to apply the brake, the lever being adapted to be depressed to release the brake; and a member carried by the lever operable for holding the lever in its brake releasing position against the pressure of the brake applying means, the said member being releasable automatically when the depressing force is removed whereupon the first mentioned means will apply the brake.

8. A brake mechanism including a control lever; means tending to apply the brake, the lever being adapted to be depressed to release the brake; a foot plate carried by the lever; and means operable by the plate for holding the lever in its brake releasing position against the pressure of the brake applying means, the holding means including a roller and a stationary member having an inclined surface adapted to be engaged by the roller.

9. A brake mechanism including a control lever; a foot plate for moving the lever to release the brake, the foot plate being pivoted on the lever; means operable by rocking the plate relative to the lever for holding the latter in its brake releasing position; and separate means for locking the foot plate from rocking relative to the lever so that the latter will be retained in its brake releasing position.

10. A brake mechanism including a control lever; a foot plate for moving the lever to release the brake, the foot plate being pivoted on the lever; means operable by rocking the plate relative to the lever for holding the latter in its brake releasing position; and a releasable locking member for retaining the foot plate in position to cause the holding means to hold the lever in its brake releasing position.

MAUNSELL B. JACKSON.